United States Patent
Chen et al.

(10) Patent No.: US 7,974,239 B2
(45) Date of Patent: Jul. 5, 2011

(54) GENERALIZED "EVENLY DISTRIBUTED MAS ALLOCATION" POLICY TO SUPPORT LOW-POWER UWB APPLICATIONS

(75) Inventors: Richard Y. Chen, Croton-on-Hudson, NY (US); Takashi Sato, Cupertino, CA (US); Javier Del Prado Pavon, Mougins (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 969 days.

(21) Appl. No.: 11/817,830

(22) PCT Filed: Mar. 8, 2006

(86) PCT No.: PCT/IB2006/050731
§ 371 (c)(1),
(2), (4) Date: Sep. 5, 2007

(87) PCT Pub. No.: WO2006/095323
PCT Pub. Date: Sep. 14, 2006

(65) Prior Publication Data
US 2008/0205353 A1    Aug. 28, 2008

Related U.S. Application Data

(60) Provisional application No. 60/659,612, filed on Mar. 8, 2005.

(51) Int. Cl.
*H04W 4/00* (2009.01)

(52) U.S. Cl. .......... 370/329; 370/337; 370/348
(58) Field of Classification Search ............... None
See application file for complete search history.

(56) References Cited

U.S. PATENT DOCUMENTS

| 5,515,379 | A | 5/1996 | Crisler | |
|---|---|---|---|---|
| 5,535,207 | A * | 7/1996 | Dupont | 370/433 |
| 6,108,316 | A | 8/2000 | Agrawal | |
| 2002/0093930 | A1 | 7/2002 | Dertz | |
| 2002/0099854 | A1 * | 7/2002 | Jorgensen | 709/249 |
| 2004/0264397 | A1 | 12/2004 | Benveniste | |
| 2005/0036466 | A1 | 2/2005 | Malik | |
| 2006/0133272 | A1 * | 6/2006 | Yuan et al. | 370/230 |
| 2007/0104215 | A1 * | 5/2007 | Wang et al. | 370/458 |

FOREIGN PATENT DOCUMENTS
WO    2004034644 A2    4/2004
* cited by examiner

*Primary Examiner* — Jayanti K Patel
*Assistant Examiner* — Anthony Sol
(74) *Attorney, Agent, or Firm* — Larry Liberchuk

(57) ABSTRACT

In order that media access slots MAS are allocated based on minimum latency requirements of, for example, not less than 4 ms, or on a medium utilization efficiency or power consumption requirement for a minimum reservation block length, both high-efficiency and low-latency schemes (or category) need to coexist within a superframe with fair support given to both. The maximization of contiguous available MAS between low-latency and high-efficiency schemes ensures that power saving and overhead risk are minimized without compromising the support for low-latency applications.

6 Claims, 3 Drawing Sheets

GENERALIZED "EVENLY DISTRIBUTED MAS ALLOCATION" POLICY TO SUPPORT LOW-POWER UWB APPLICATIONS

This Application claims the benefit of priority from prior U.S. application 60/659,612, filed Mar. 8, 2005, the teachings of which are herein incorporated by reference.

The wireless communication bandwidth has significantly increased with advances of channel modulation techniques, making the wireless medium a viable alternative to wired and optical fiber solutions. As such, the use of wireless connectivity in data and voice communications continues to increase. These devices include mobile telephones, portable computers in wireless networks (e.g., wireless local area networks (WLANS), as well as audio/visual streaming, video/audio telephony, stationary computers in wireless networks, and portable handsets, to name only a few.

Each wireless network includes a number of layers and sub-layers, such as the Medium Access Control (MAC) sub-layer and the Physical (PHY) layer. The MAC layer is the lower of two sublayers of the Data Link layer in the Open System Interconnection (OSI) stack. The MAC layer provides coordination between many users that require simultaneous access to the same wireless medium.

The MAC layer protocol includes a number of rules governing the access to the broadcast medium that is shared by the users within the network. As is known, several different multiple access technologies (often referred to as MAC protocols) have been defined to work within the protocols that govern the MAC layer. These include, but are not limited, to Carrier Sensing Multiple Access (CSMA), Frequency Division Multiple Access (FDMA) and Time Division Multiple Access (TDMA).

While standards and protocols have provided for significant improvement in the control of voice and data traffic, the continued increase in the demand for network access at increased channel rates while supporting quality-of-service (QoS) requirements have required a continuous evaluation of protocols and standards and changes thereto. For example, many known protocols such as the WiMedia Ultra-Wide Band (UWB) MAC 1.0 (published as ECMA standard 368) and other non-slot based WLANs such as IEEE 802.11, require that QoS requirements from applications are passed down to lower layers of networking stack based on the Traffic Specifications (TSPEC) of the application stream. Upon receiving the TSPEC of the application stream, lower layers such as the MAC allocate resource to serve the traffic stream to meet the QoS requirements. In various MAC protocols, one such resource is the airtime available for transmission of data or other information. QoS provisioning in these wireless MAC protocols usually involves allocation of airtime according to a QoS requirement specified, for example, in the TSPEC. For example, in slot-based MAC protocol, such as the WiMedia UWB MAC, there are various ways to allocate media access slot (MAS) (e.g., medium access time) that result in performance differences in delay, power saving, etc.

Allocation of contiguous blocks of airtime for data or airtime transmission can lead to large maximum service intervals for an application stream. This may result in a large delay bound. However, evenly distributed, smaller time allocation for data transmission over the course of a superframe requires the transmission device to "wake up" frequently. Each wake up takes 200-300 µs, equivalent to the time equivalent of one MAS. This leads to poor power-saving performance. Additionally, too many smaller distributed fragments of time allocation over the course of a superframe may also not enable successful transmission of an entire packet. Further, requiring fragmentation of allocated MAS for data transmission within a superframe increases the amount of overhead. Overhead can be, for example, MAC inter-frame space (IFS), packetization delay, and at the end of a superframe, if there is not enough time to transmit, a transmitter will have to wait for a subsequent service interval to send its entire packet.

What is needed, therefore, is a method and system that substantially overcomes at least the shortcomings of known methods described.

In accordance with an example aspect, a method of allocating medium access time in a wireless network includes the steps of: determining a periodic service interval of an application stream based on a TSPEC, a delay requirement, and local resource; defining a low-latency category and a high-efficiency category of the application stream; categorizing the application stream into one of the low-latency category or the high-efficiency category based on the determined periodic service interval; and allocating medium access time within the periodic service interval based on the categorizing step.

In one embodiment, the defining step includes establishing a threshold for the periodic service interval.

In one embodiment, the categorizing step includes determining whether the periodic service interval exceeds the threshold.

In one embodiment, the allocating step includes spreading medium access slots evenly over a superframe in each of a plurality of allocation zones available for transmission upon categorizing the periodic service interval into a low-latency category.

In one embodiment, the allocating step includes allocating contiguous MAS upon categorizing the periodic service interval into a high-efficiency category.

In one embodiment, the step of spreading MAS evenly over a superframe includes allocating the location of medium access slots within a specific portion of a two-dimensional representation of a superframe.

In one embodiment, the allocating contiguous MAS includes allocating the location of medium access slots within a specific portion of a two-dimensional representation of a superframe.

In one aspect, a method of allocating medium access time in a wireless network includes the steps of: determining a periodic service interval of each of at least two application streams based on a TSPEC, a delay requirement, and local resource of each application stream; defining a low-latency category and a high-efficiency category for all application streams; categorizing each of the at least two application stream into one of the low-latency category or the high-efficiency category based on the determined periodic service interval; and allocating medium access time within a superframe based on the categorizing step.

In one embodiment, the allocating step further comprises maximizing the distance in a two dimensional representation of a superframe between low-latency category application stream and a high-efficiency category application stream.

In one aspect, a system for allocating medium access slots includes: a plurality of wireless devices. The wireless devices each include: a transmitter for transmitting a signal; a receiver for receiving the signal; and a processor; and a power source; wherein the processor determines a periodic service interval based on a TSPEC, a delay requirement, and local resource of an application stream; defines a low-latency category and a high-efficiency category of the application stream; categorizes the application stream into one of the low-latency category or the high-efficiency category based on the determined periodic service interval; and allocates medium access time within the superframe based on the categorization.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 1:
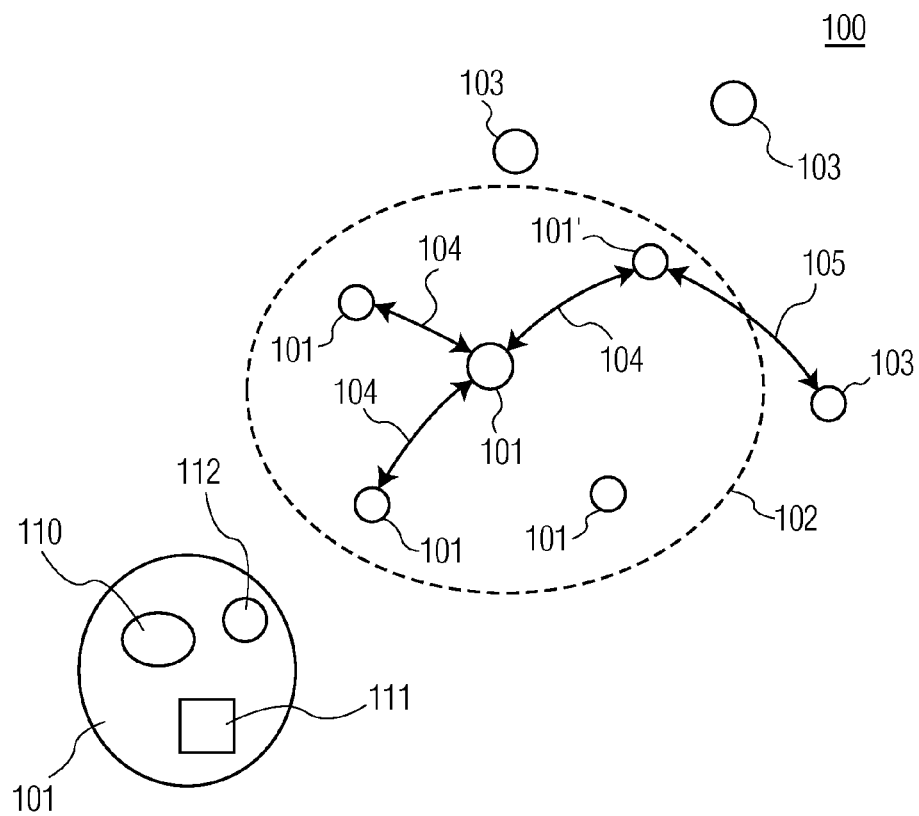
FIG. 1 is a diagram representative of wireless communication network system sharing a medium in accordance with an example embodiment.

In the following detailed description, for purposes of explanation and not limitation, example embodiments disclosing specific details are set forth in order to provide a thorough understanding of the example embodiments. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the present invention. Nonetheless, such devices, methods, systems and protocols that are within the purview of one of ordinary skill in the art may be used in accordance with the example embodiments. Finally, wherever practical, like reference numerals refer to like features.

Briefly, in accordance with illustrative embodiments, methods and system are described that improve the efficiency and throughput in a distributed wireless network. The methods and system calculate the maximum service interval that will meet the delay requirement and TSPEC of one or more application streams. This is accomplished, for example, by allocating contiguous MAS (i.e., portions of media access time) to minimize power loss due to numerous "wake-up" operations.

In accordance with the example embodiments described herein, distributed (i.e., slot-based) wireless networks operate under WiMedia MAC 1.0. Of course, this is merely illustrative, and other MAC protocols may incorporate the sharing of availability of the devices within the network that are described in connection with the example embodiments. These include, but are not limited to, the progeny of the current WiMedia MAC protocol, as well as other carrier sense multiple access with collision avoidance (CSMA/CA) protocols or Time Division Multiple Access (TDMA) protocols. Additionally, the embodiments described herein may also apply to WLANs having non-slot based media access, such as IEEE 802.11 WLAN. It is emphasized that these protocols are merely illustrative and that other protocols within purview of one of ordinary skill in the art may be implemented in accordance with the example embodiments.

FIG. 1 is a schematic diagram of a wireless network system that includes plurality of wireless devices or systems sharing a communications medium (i.e., co-existing) in accordance with an example embodiment. Wireless devices/systems 101 may transmit or receive (or both) traffic 104 to from other wireless devices 101 within their transmission range 102. Moreover, there may be other wireless devices/systems 103 that are outside the range 102 of certain wireless devices/systems 101, but within the range of certain devices 101'. Wireless devices 101 contain a transceiver 110 (e.g., any known transmitter/receiver combination, or a separate transmitter and receiver), a processors 111 (e.g., any known device which processes bits of information), and a power source 112 (e.g., a battery).

Figure 2:
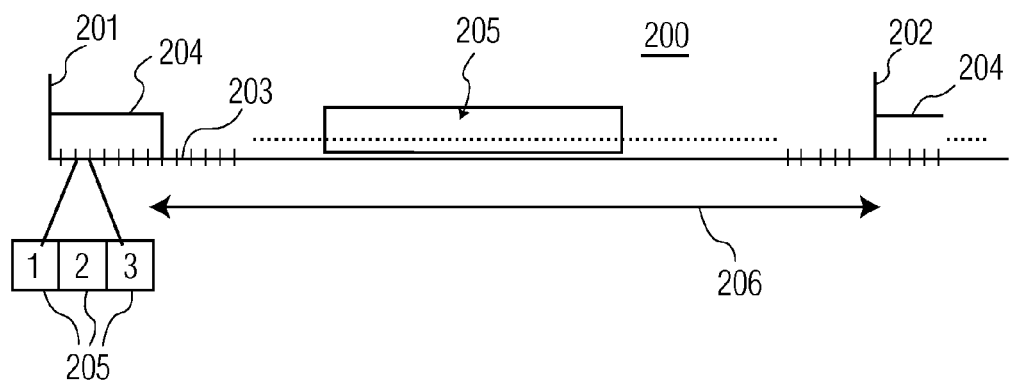
FIG. 2 is a time-line of a superframe in accordance with an example embodiment.

FIG. 2 is a time line 200 of a superframe between a first beacon 201 and a second beacon 202. As used herein, the starting point of the beacons is referred to as the Beacon Period Start Time (BPST), and there is a prescribed period of time between beacons. In an example embodiment, the superframe is divided into a plurality of medium access slots (MAS) 203, which provide for organized transmission and reception in keeping with the example embodiments. In an illustrative embodiment, there are 256 slots 203, with each slot having a duration of approximately 256 µs, so the entire duration of the superframe is approximately 65.536 ms in the example embodiment (thus 65.536 ms between BPSTs). Of course the number and duration of the slots 203 is merely for purposes of illustration and are in no way limitations of the slots 203.

At the beginning of each superframe 200 there is a beacon interval 204. As will become clearer as the present description continues, the beacon interval 204 provide the vehicle for the sharing of availability information of the devices/systems (e.g., devices 101, 103) of the network 100, as well as the needs of devices/systems to send traffic to other devices/systems of the wireless network 100 of the example embodiments.

After the beacon interval 204 is a service interval 206. Each service interval comprises a certain number of slots. Different application streams require different numbers of slots 203 to ensure adequate medium access for complete packet transmission. A processor in a transmitter determines how much of the service interval it requires to transmit its data packets. This determination occurs by analyzing the bandwidth requirement, delay requirement, and TSPEC of the application stream. Additionally, service intervals are periodic (i.e., occurring over several cycles of beacon interval 204 and service interval 206).

To calculate the periodic service interval, a processor (e.g., processor 111 in FIG. 1) calculates a service rate g according to a TSPEC and local resource, such as buffer size. Local resource may also be, for example, medium time and buffer space required by a transmitter to transmit its data within the MAC in which it operates. The processor also calculates the queuing delay $d_q$ caused by burst size of the application stream by using the calculated g. The maximum service interval 206 can be calculated by based on the delay requirement. For example, slot-based media access mechanisms such as WiMedia UWB can be calculated as follows:

$$SI \leq d_s - d_q$$

where $d_s$ is the delay requirement and $d_q$ is the additional queuing delay caused by the burst size of the application stream.

Figure 3:
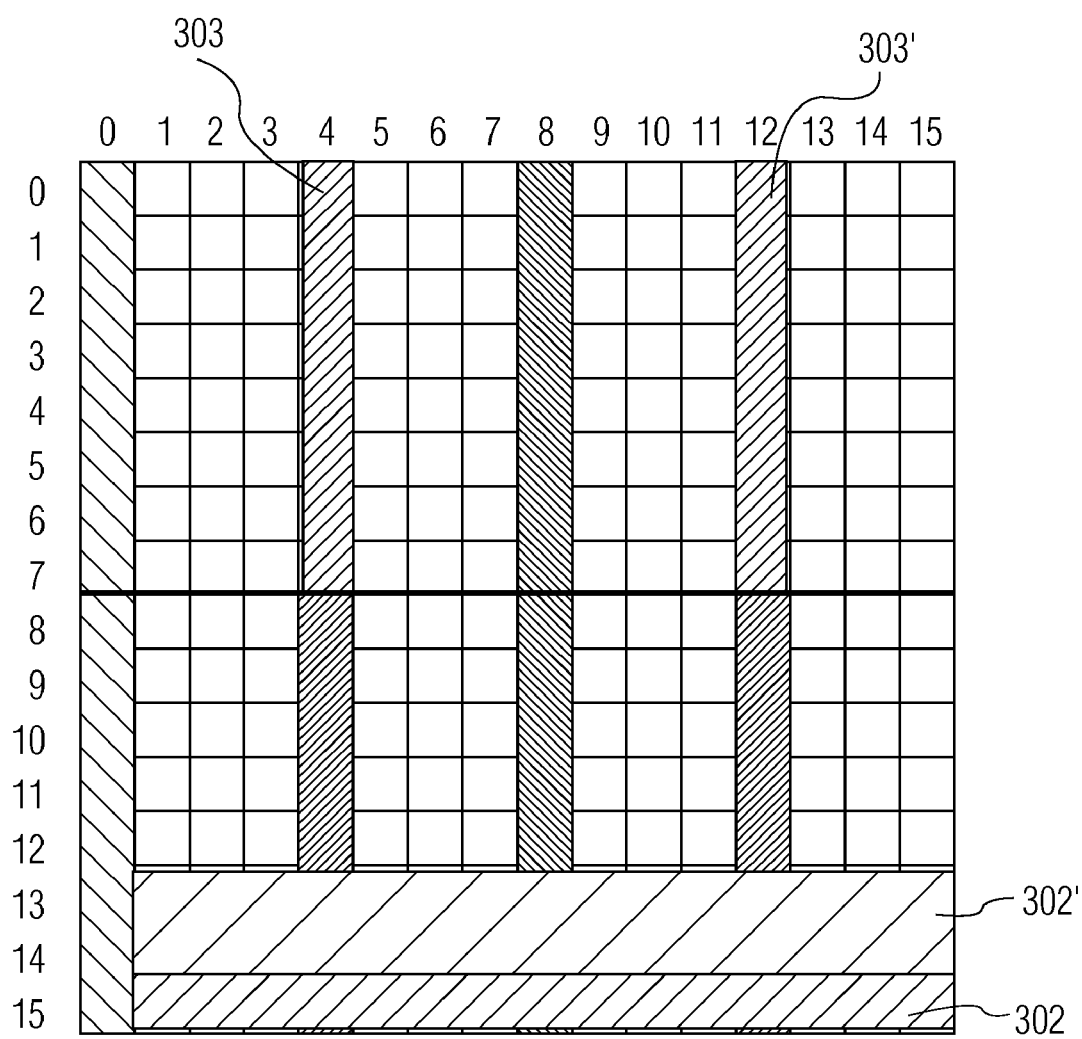
FIG. 3 is a two dimensional representation of a superframe.

FIG. 3 depicts a two-dimensional representation of superframe 200. The y-axis of the representation is MAS increasing sequentially in the downward direction. The x-axis of the representation is allocation zone that increases sequentially in the horizontal direction (i.e., from left to right on the figure). Allocation zones 1-15 represent a contiguous grouping of MAS. Sequentially in time, MAS where x=2 and y=1 follows MAS where x=1 and y=15. According to the prior art, incoming application streams were pre-assigned either a high-efficiency scheme or a low-latency scheme, depending on QoS requirements of the MAC and the application scheme requirements. In a low-latency scheme, data transmission occurs exclusively in MAS slots (e.g., row components) where x=1, y=15; x=2, y=15, . . . , x=15, y=15. In FIG. 3, block 302 depicts a low-latency scheme for MAS allocation. This scheme forces a wake up, for example, every 4.096 ms and only allows a maximum of one MAS per wake up for transmission. This requires power for each wake up, and may be inefficient due to overhead.

For a high-efficiency scheme, contiguous MAS blocks are utilized. The example in FIG. 3 depicts data transmission in MAS slots x=4, y={0, ..., 7}, and x=12, y={0, ..., 7}. These contiguous MAS blocks offer reduced power by requiring fewer wake up operations, and include less overhead risk. Blocks 303, 303' in FIG. 3 depict a high-efficiency scheme for MAS allocation.

In order that MAS are allocated based on minimum latency requirements of, for example, not less than 4 ms, or on a medium utilization efficiency or power consumption requirement for a minimum reservation block length, both high-efficiency and low-latency schemes (or category) need to coexist within a superframe with fair support given to both.

As an example, WiMedia UWB MAC 1.0 calls for a 256 MAS superframe structured into 16 allocation zones (e.g., the x-axis of FIG. 3) and 16 row components (e.g., the y-axis of FIG. 3). This requires the accommodation of both a high-efficiency scheme required by an application stream and a low-latency scheme required by either the same application stream or an additional application stream. One possible policy is to:

1) strictly apply the low-latency distribution for each individual subset of 16 row components. An example of this could be distributing individual streams over row components (e.g., portions of 15 MAS where x={2 ... 15} and y=15) at either end of an allocation zone.
2) remove even distribution restrictions for the rest of the row components (e.g., contiguous portions of MAS within an allocation falling along the x-axis that are not within the previous subset of row components). This allows for a determination of whether a periodic service interval required by a device exceeds a threshold 301 and thereby requires even distribution of MAS in every row component.
3) if the periodic service interval of a particular application stream requires MAS allocation that exceeds threshold 301, this requires a high-efficiency scheme and MAS is allocated is contiguous blocks within a subset of available allocation zones. The MAS, in this case, should be allocated within allocation zones on the opposite side of the two-dimensional superframe representation to maximize contiguous available MAS between high-efficiency and low-latency schemes.

There may also be two devices with separate application streams that wish to transmit in the same superframe. Each application stream will have a periodic service interval that may require either a high-efficiency or low-latency scheme. In this case, the periodic service interval of each application stream must be determined from their respective TSPECS. Each periodic service interval is classified as high-efficiency or low-latency and MAS is allocated within allocation zones on opposite sides of a two-dimensional superframe representation to maximize contiguous available MAS between the two schemes. Multiple streams requiring a high-efficiency scheme can also be allocated MAS within individual allocation zones, or within alternating allocation zones.

The maximization of contiguous available MAS between low-latency and high-efficiency schemes ensures that power saving and overhead risk are minimized without compromising the support for low-latency applications.

Figure 4:
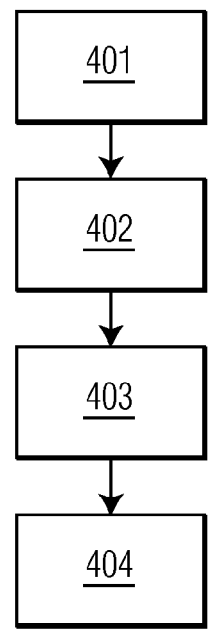
FIG. 4 is a method of transmitting information over a wireless network.

FIG. 4 depicts a flow-chart diagram of the method of allocating medium access time in a wireless network. In step 401, a processor determines a periodic service interval based on a transmission specification (TSPEC), a delay requirement, and local resource of an application stream. This determination can also be made for multiple application streams with multiple properties. In step 402 the processor defines a high-efficiency and a low-latency scheme. This definition may be stored in the processor, provided in a lookup table, or defined in any other manner known in the art. The processor categorizes the application stream as either high-efficiency or low-latency in step 403 depending on power sensitivity and MAS availability. The processor then allocates MAS during which the transmitter can transmit data based on the categorization in step 404.

Figure 5:
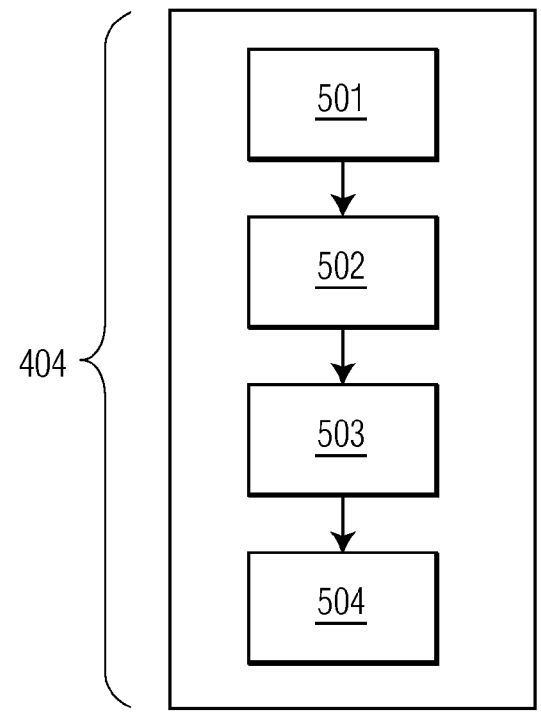
FIG. 5 is a method of allocating MAS in a superframe.

FIG. 5 depicts additional substeps of step 404. In step 501, the processor allocates medium access slots evenly over a superframe in each of a plurality of allocation zones available for transmission upon categorizing the periodic service interval into a low-latency category. In step 502, the processor allocates contiguous medium access slots upon categorizing the periodic service interval into a high-efficiency category. In step 503, the processor spreads medium access slots evenly over a superframe by allocating the location of medium access slots within a specific portion of a two-dimensional representation of a superframe for low-latency category application streams. In step 504, the processor allocates contiguous medium access slots within a specific portion of a two-dimensional representation of a superframe for high-efficiency category applications streams. Steps 501-504 may occur individually in step 404 or in any temporal order. Some of steps 501-504 may not occur at all.

In view of this disclosure it is noted that the various methods and devices described herein can be implemented in hardware and software known to achieve efficient medium access and sharing in a distributed wireless network. Further, the various methods and parameters are included by way of example only and not in any limiting sense. In view of this disclosure, those skilled in the art can implement the various example devices and methods in determining their own techniques and needed equipment to effect these techniques, while remaining within the scope of the appended claims.

The invention claimed is:

1. A method of allocating medium access time in a wireless network, comprising:
    determining a periodic service interval of an application stream based on a transmission specification (TSPEC), a delay requirement, and local resource;
    defining a low-latency category and a high-efficiency category of the application stream;
    categorizing the application stream into one of the low-latency category or the high-efficiency category based on the determined periodic service interval;
    allocating medium access time within a superframe based on the categorizing, wherein (a) medium access slots for the low-latency category of the application stream are located within a first portion of a two-dimensional representation of the superframe and (b) medium access slots for the high-efficiency category of the application stream are located within a second portion of the two-dimensional representation of the superframe, and wherein the distance in the two-dimensional representation of the superframe is maximized between the low-latency category and the high-efficiency category.

2. The method of claim 1, wherein the defining further comprises establishing a threshold for the periodic service interval.

3. The method of claim 2, wherein the categorizing further comprises determining whether the periodic service interval exceeds the threshold.

4. The method of claim 3, wherein the allocating further comprises spreading medium access slots evenly over the superframe in each of a plurality of allocation zones available for transmission upon categorizing the periodic service interval into the low-latency category.

5. The method of claim 3, wherein the allocating further comprises allocating contiguous medium access slots upon categorizing the periodic service interval into the high-efficiency category.

6. A system for allocating medium access slots, comprising:
 a plurality of wireless devices, said wireless devices each comprising:
  a transmitter for transmitting a signal;
  a receiver for receiving the signal;
  a processor; and
  a power source;
wherein the processor determines a periodic service interval based on a transmission specification (TSPEC), a delay requirement, and local resource of an application stream; defines a low-latency category and a high-efficiency category of the application stream; categorizes the application stream into one of the low-latency category or the high-efficiency category based on the determined periodic service interval; and allocates medium access time within a superframe based on the categorization, wherein (a) medium access slots for the low-latency category of the application stream are located within a first portion of a two-dimensional representation of the superframe and (b) medium access slots for the high-efficiency of the application stream are located within a second portion of the two-dimensional representation of the superframe, and wherein the distance in the two-dimensional representation of the superframe is maximized between the low-latency category and the high-efficiency category.

* * * * *